United States Patent Office 3,792,095
Patented Feb. 12, 1974

3,792,095
PROCESS FOR PRODUCING SULPHOXIDES
Tamara Petrovna Burmistrova, ulitsa Kosmonavtov 2, kv. 36, Kazan, U.S.S.R.; Tatyana Alexandrovna Bardina, Belyalvo-Bogorodskoe 38, kv. 44; Grigary Davidovich Galpern, Leninsky prospekt 13, kv. 38; and Helena Nikolaevna Karaulova, ulitsa Khersonskaya 7, kv. 393, all of Moscow, U.S.S.R.; and Nonna Alexandrovna Luchai, ulitsa Entuziastov 1, kv. 2; Nikolai Nikolaevich Terpilovsky, ulitsa Dostoevskogo 79a, kv. 20; and Adolf Alexandrovich Khitrik, ulitsa Sibirsky trakt 32, kv. 8, all of Kazan, U.S.S.R.
No Drawing. Filed Sept. 9, 1971, Ser. No. 179,208
Claims priority, application U.S.S.R., Sept. 11, 1970, 1467545
Int. Cl. C07c *147/14*
U.S. Cl. 260—607 A                              4 Claims

ABSTRACT OF THE DISCLOSURE

A process for producing sulphoxides which comprises oxidizing organic sulphides with hydrogen peroxide under foam-emulsion conditions created by blowing a gas which is inert in respect of the sulphides and hydrocarbons into the reaction mass at a rate ensuring a foaming ratio of at least 2 and at a temperature of 20–115° C., followed by isolation of the desired product. The sulphoxides thus obtained are useful as extraction and flotation reagents in hydrometallurgy and also as desiccants, defoliants, and for treating fungal diseases of animals.

---

The present invention relates to a process for producing sulphoxides which are useful as extraction and flotation reagents and also as desiccants and defoliants as well as remedies for treating fungal diseases of animals.

Known in the art is a process for producing sulphoxides comprising mixing sulphide distillates with hydrogen peroxide and adding catalytical amounts of sulphuric acid and an emulsifier. On completion of the reaction the mixture is allowed to settle and the aqueous acidic layer is separated therefrom. The organic layer is treated with 55–60% sulphuric acid. The resulting sulphuric acid layer containing sulphoxides is separated, whereafter the desired product (sulphoxides) is isolated by alkalization or by diluting with water. The yield is 90% by weight. On oxidation of medium oil distillates the sulphoxide sulphur content of the desired product is 10–12% by weight; the overall sulphur content is 11–13% by weight; sulphones— about 10% by weight (see U.S.S.R. Inventor's Certifiicate No. 206,579).

Said prior art process has disadvantages residing in a long process duration (about two hours) and complicated process technology caused by the necessity to employ an emulsifier and sulphuric acid as a catalyst and sulphoxide extraction reagent.

The employment of sulphuric acid for commercial implementation of the process gives rise to some difficulties due to the need of special equipment and utilization of wastes such as diluted sulphuric acid.

It is an object of the present invention to eliminate said disadvantages.

It is a specific object of the present invention to simplify the process technology and to reduce the reaction time by modifying the process steps.

These and other objects are accomplished in that in a process for producing sulphoxides by oxidizing organic sulphides with hydrogen peroxide followed by isolation of the final product the reaction according to the present invention is carried out under specific foam-emulsion conditions. The foam-emulsion conditions are created by blowing a gas which is inert in respect of the sulphide compounds and hydrocarbons into the reaction mixture.

The blowing of gases is carried out at a rate ensuring the creation of a highly-dispersed three-phase system mono- or poly-component organic liquid phase; mono- or poly-component gas phase. The foaming ratio (foam volume to initial liquid volume ratio) that provides complex foam and emulsion processes equally is at least 2 at a temperature of 20–115° C.

Air is advantageously used as the inert gas.

A catalyst such as acetic acid in an amount of 1–2% by weight based on the starting materials is employed to accelerate the process.

To simplify the process technology the isolation of the desired product is effected by extraction with 70–90% acetic acid at a ratio of from 1:1 to 2.2:1 based on the weight of the reaction mixture.

The present invention may be carried out as follows:

The process can be effected periodically or continuously.

It is preferable to effect the process in a flowing-stream foam reactor with a concurrent flow of reagents which is a multi-stage column provided with four plates mounted on different levels and dividing the reactor into four zones, the first three zones being reaction zones and the fourth being a cooler-condenser. The temperature in all the zones is maintained constant. In the lower part of the column there are inlets for air and reagent supply. Foaming is effected by a well dispersed inert gas, preferably air. Dispergation is effected by means of special perforated plates. The whole system operates on the "Ideal displacement" principle, where as each individual zone works on the principle of "ideal mixing."

Organic sulphides such as fractions, of sulphur containing crude, hydrogen peroxide in an amount equivalent to the sulphide sulphur content of a fraction, and the catalyst (acetic acid) in an amount of 1–2% by weight based on the starting materials are introduced into the lower part of the column. Foaming and emulsifying to a three-phase system is effected by an inert gas, preferably air, admitted via a special socket pipe into the lower part of the column. The foaming ratio is at least 2. The process is preferably effected at a temperature of from 20 to 115° C. for a period of 10–30 minutes. The duration of the process and the temperature thereof are functions of the sulphide concentration in the starting materials. The oxidized sulphides are delivered via the upper part of the reactor to the extraction stage. Isolation of the sulphoxides can be effected by conventional means. It is preferable to isolate the sulphoxides by extraction with 70–80% acetic acid, whereupon the sulphoxides are extracted from the distillate into the acetic acid layer, which is separated from the mixture after settling thereof, acetic acid being evaporated in vacuum to yield the final product. The yield of the final product is up to 95% by weight. The resulting product is a 90% sulphoxide concentrate which is free from any noticeable amount of sulphone impurities. The sulphoxide sulphur content is 10.4%; the overall sulphur content is 10.5% by weight.

The process according to the present invention permits a reduction in the reaction time, when a catalyst is employed and the sulphide sulphur content is of at least 0.5% by weight, to 10–30 minutes (the process duration according to the known method is up to two hours) and a simplification of the proess technology by substituting acetic acid for sulphuric acid.

This makes it possible to employ less sophisticated process equipment, to eliminate the necessary of recovering waste products and improves the efficiency of the process, since the extraction reagent (acetic acid) is recycled to the sulphoxide extraction stage. The foam-emulsion conditions of the process allow an increase in the reaction rate by considerably developing the interphase area whereby heat control of the process is made easier, the product quality is improved, and more particularly, the sulphone content of the final sulphoxides is reduced, while the product resinification is lowered.

The process for producing sulphoxides in accordance with the present invention is further illustrated by the following examples.

EXAMPLE 1

To 84.3 g. of Arlan crude distillate with the boiling range of 190–360° C. and the overall sulphur content of 2.3% and sulphide sulphur content of 1.3% by weight, 3.8 g. of 30% hydrogen peroxide and 1 ml. of acetic acid are added. The oxidation is carried out in a foam-emulsion reactor. Foaming is accomplished by introducing air into the reaction mixture at a space velocity of 2.6 l./min. and the foaming ratio is maintained at 5. The oxidation is carried out for 30 minutes at the temperature of 80° C. The sulphoxide sulphur content of the oxidized distillate is 0.9% by weight which corresponds to the 70% oxidation level of the sulphides. The oxidized distillate after separation thereof from the aqeuous phase is extracted several times with 70% acetic acid.

The extract is separated, acetic acid is distilled off in vacuum, the residue is washed with water and dried by azeotropic distilling off with benzene to yield 7 g. of the desired product containing 11.6% by weight of sulphoxide sulphur.

EXAMPLE 2

84.3 g. of a Romashkino crude fraction with the boiling range of 190–360° C. and the overall sulphur content of 0.98% by weight, sulphide sulphur content of 0.47% by weight are subjected to oxidation at a temperature of 115° C. for 15 minutes in a manner similar to that described in Example 1.

The sulphoxide sulphur content of the oxidized product is 0.4% by weight. The level of oxidation to sulphoxides is 85%. The sulphoxides are extracted from the oxidized distillate with 70% acetic acid. The yield of the sulphoxides is 94%, the sulphoxide sulphur content being 10.7% by weight.

EXAMPLE 3

84.3 g. of a South-Uzbek crude distillate with the boiling range of 200–400° C. and the sulphide sulphur content of 1.5% by weight, is oxidized in a manner similar to that described in Example 1. The sulphoxide sulphur content of the oxidized product is 1.36% by weight. The level of oxidation to sulphoxides is 90%.

The extraction with acetic acid is carried out as disclosed in Example 1. The yield of the sulphoxides is 80% by weight; the sulphoxide sulphur content is 10.8% by weight.

EXAMPLE 4

Into 75 g. of a sulphide concentrate (recovered by extracting an Arlan crude fraction with the boiling range of 150–325° C.) containing 15% by weight of the total sulphur and 10.4% by weight of the sulphide sulphur, air is introduced at a space velocity of 2.5 l./min. with the foaming ratio being maintained at 5. The mixture is heated to 80° C. and 27.4 g. of 30% hydrogen peroxide and 3.7 g. of glacial acetic acid are added thereto. The oxidation in a three phase system lasts for 0.3 hr. Thereafter acetic acid is added to the reaction mixture until the 60% concentration in the aqueous layer is reached. Then the lower layer containing sulphoxides dissolved in acetic acid is separated, the acetic acid is distilled off to yield 97.6 g. of sulphoxides (86% by weight); the overall sulphur content is 14.2% by weight; the sulphoxide sulphur content is 14.2% by weight.

EXAMPLE 5

84.0 g. of a Tyumen crude fraction with the boiling range of 190–360° C., a sulphide sulphur content of 0.28% by weight and the overall sulphur content of 0.72% by weight are oxidized in a foam-emulsion reactor. Air is introduced into the reactor at a space velocity of 2.64 l./min. with the foaming ratio being established at 3; the reactor contents are heated up to 115° C. whereafter 0.9 g. of 30% hydrogen peroxide is added thereto. After carrying out the oxidation reaction for 2.5 hours the sulphoxide sulphur content in the oxidized product is 0.19% by weight. The level of oxidation to sulphoxides is 70%. The removal of acetic acid is effected in a manner similar to that disclosed in Example 1 to produce 85% by weight of sulphoxides with a sulphoxide sulphur content of 10.5% and an overall sulphur content of 10.6% by weight.

EXAMPLE 6

Into 75 g. of the Arlan crude sulphide condensate described in Example 4 air is introduced at the space velocity of 2.5 l./min.; the mass is heated at 80° C. and 27.4 g. of 33% hydrogen peroxide is then added thereto. After 8 hours of oxidation acetic acid is added to the reaction mixture until the 60% concentration in the aqueous layer is reached. The lower layer containing sulphoxides dissolved in acetic acid is then separated and the acetic acid is distilled off. The yield of the sulphoxides is 70% by weight; the sulphoxide sulphur content is 13% by weight.

EXAMPLE 7

The reaction is carried out continuously in a current flow foam reactor with a concurrent flow of the reagents; said reactor is a multi-stage column provided with four plates being mounted at different levels and separating the reactor into four zones. The first three thereof are reaction zones whereas the fourth zone is a cooler-condenser. The temperature in all the zones is maintained constant and equal to 115° C. In the lower part of the column there are inlets for air and reagents supply. Foaming and emulsifying is effected by air. The whole column operates on the principle of "ideal mixing." The crude fraction described in Example 1 is introduced in the reactor at the rate of 337 g./hr. and at the same time 30% hydrogen peroxide and acetic acid are added thereto at the rate of 13.8 g./hr. and 4 g./hr. respectively.

On continuously operating the reactor for 14 hours at the foaming ratio of 2 there is observed a stable composition of the oxidized product, which is characterized by a sulphoxide sulphur content of 0.85% by weight.

The sulphoxide isolation is effected in a manner similar to that disclosed in Example 1. There is produced 90% by weight of sulphoxides with the sulphoxide sulphur content of 10.4% by weight and the overall sulphur content of 10.6 by weight.

We claim:

1. A process for producing sulphoxides comprising oxidizing a sulphide-containing petroleum material with hydrogen peroxide in the presence of acetic acid under foam emulsion conditions created by blowing a gas which is inert in respect of the sulphides and hydrocarbons into the reaction mass at a rate ensuring a foaming ratio of at least 2 and at a temperature of 20–115° C., and isolating the final product.

2. A process as claimed in claim 1, wherein the inert gas is air.

3. A process as claimed in claim 1, wherein acetic acid is used in an amount of 1–2% by weight based on the starting materials.

4. A process as claimed in calim 1, wherein the isolation of the sulphoxides is effected by extraction with 70–90% acetic acid at a ratio of from 1:1 to 2.2:1 relative to the weight of the reaction mixture.

References Cited

UNITED STATES PATENTS

| | | | |
|---|---|---|---|
| 3,005,852 | 10/1961 | Freyermuth et al. | 260—607 A |
| 3,539,635 | 11/1970 | Priestley | 260—607 A |

LEWIS GOTTS, Primary Examiner

D. R. PHILLIPS, Assistant Examiner